US009911179B2

(12) United States Patent
Su et al.

(10) Patent No.: US 9,911,179 B2
(45) Date of Patent: Mar. 6, 2018

(54) IMAGE DECONTOURING IN HIGH DYNAMIC RANGE VIDEO PROCESSING

(71) Applicant: Dolby Laboratories Licensing Corporation, San Francisco, CA (US)

(72) Inventors: Guan-Ming Su, Fremont, CA (US); Konstantinos Konstaninides, Saratoga, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 282 days.

(21) Appl. No.: 14/798,162

(22) Filed: Jul. 13, 2015

(65) Prior Publication Data
US 2016/0021391 A1    Jan. 21, 2016

Related U.S. Application Data

(60) Provisional application No. 62/026,281, filed on Jul. 18, 2014.

(51) Int. Cl.
*H04N 7/12* (2006.01)
*G06K 9/36* (2006.01)
(Continued)

(52) U.S. Cl.
CPC ........... *G06T 5/002* (2013.01); *H04N 19/117* (2014.11); *H04N 19/136* (2014.11); *H04N 19/17* (2014.11);
(Continued)

(58) Field of Classification Search
CPC .... H04N 19/593; H04N 19/30; H04N 19/186; G06T 2207/10016
See application file for complete search history.

(56) References Cited

U.S. PATENT DOCUMENTS 7,209,182 B2  4/2007  Kawabata
7,660,484 B2  2/2010  Ahn
(Continued)

FOREIGN PATENT DOCUMENTS

EP   2105023   9/2009
EP   2466898   6/2012
(Continued)

OTHER PUBLICATIONS

Lee, Ji Won, et al "Two-Stage False Contour Detection Algorithm Using Re-Quantization and Directional Contrast Features and Its Application to Adaptive False Contour Reduction" IEEE, Jan. 7-11, 2006, pp. 377-378.
(Continued)

*Primary Examiner* — Tsion B Owens

(57) ABSTRACT

A set of optimized operational parameter values is generated for performing decontouring operations on a predicted image. The predicted image is predicted from a first image mapped from a second image that has a higher dynamic range than the first image. Based on the set of optimized operational parameter values, smoothen operations and selection/masking based on a residual mask are performed on the predicted image. The set of optimized operational parameter values is encoded into a part of a multi-layer video signal that includes the first image, and can be used by a recipient decoder to generate a decontoured image based on the predicted image and reconstruct a version of the second image.

26 Claims, 8 Drawing Sheets

(51) Int. Cl.
  *G06T 5/00*    (2006.01)
  *H04N 19/30*   (2014.01)
  *H04N 19/117*  (2014.01)
  *H04N 19/136*  (2014.01)
  *H04N 19/17*   (2014.01)
  *H04N 19/86*   (2014.01)

(52) U.S. Cl.
  CPC .............. *H04N 19/30* (2014.11); *H04N 19/86* (2014.11); *G06T 2207/10016* (2013.01); *G06T 2207/20208* (2013.01)

(56) References Cited

U.S. PATENT DOCUMENTS

| | | | |
|---|---|---|---|
| 7,747,100 | B2 | 6/2010 | Kim |
| 7,995,649 | B2 | 8/2011 | Zuo |
| 8,457,439 | B2 | 6/2013 | Gu |
| 8,472,709 | B2 | 6/2013 | Guo |
| 8,503,536 | B2 | 8/2013 | Zuo |
| 8,503,542 | B2 | 8/2013 | Pao |
| 8,532,375 | B2 | 9/2013 | Bhagavat |
| 8,639,057 | B1 | 1/2014 | Mendhekar |
| 8,811,490 | B2 | 8/2014 | Su |
| 9,098,906 | B2* | 8/2015 | Bruls .................. G06T 9/004 |
| 9,521,419 | B2* | 12/2016 | Miller ................. G06F 3/14 |
| 2004/0070590 | A1 | 4/2004 | Lee |
| 2005/0135694 | A1 | 6/2005 | Daly |
| 2005/0141779 | A1 | 6/2005 | Daly |
| 2006/0233456 | A1 | 10/2006 | Ahn |
| 2006/0269159 | A1* | 11/2006 | Kim .................... G06T 5/50 382/256 |
| 2007/0286515 | A1 | 12/2007 | Kim |
| 2008/0052066 | A1* | 2/2008 | Oshikiri ............... G10L 21/038 704/221 |
| 2008/0279473 | A1 | 11/2008 | Daly |
| 2008/0298711 | A1 | 12/2008 | Daly |
| 2009/0060375 | A1 | 3/2009 | Lim |
| 2010/0066912 | A1 | 3/2010 | Kumwilaisak |
| 2010/0135575 | A1 | 6/2010 | Guo |
| 2010/0142808 | A1 | 6/2010 | Bhagavat |
| 2011/0129020 | A1 | 6/2011 | Li |
| 2011/0194618 | A1* | 8/2011 | Gish ................... G06T 5/50 375/240.25 |
| 2013/0022106 | A1 | 1/2013 | Pao |
| 2013/0128122 | A1 | 5/2013 | Wang |
| 2013/0177066 | A1* | 7/2013 | Ye ..................... H04N 19/36 375/240.02 |
| 2015/0092847 | A1 | 4/2015 | Su |
| 2015/0365688 | A1* | 12/2015 | Su ..................... H04N 19/11 375/240.03 |

FOREIGN PATENT DOCUMENTS

| | | |
|---|---|---|
| WO | 1999/055078 | 10/1999 |
| WO | 2008/085377 | 10/2008 |
| WO | 2013/067113 | 5/2013 |
| WO | 2014/107255 | 7/2014 |
| WO | 2015/073373 | 5/2015 |

OTHER PUBLICATIONS

Sampson, D.G. "A Method for Enhancing the Picture Quality of Low-Bit Rate Block-Coded Images" Image Processing and its Applications, Fifth International Conference, Jul. 4-6, 1995, pp. 40-44.

* cited by examiner determne image areas with a high confidence level to have false contouring in an image 302 calculate smoothness measures with candidate operational parameter values with respect to the high confidence image areas for flat areas 304 select optimal operational parameter values from the candidate operational parameter values 306

FIG. 3 determine flat image areas in a predicted image 502 generate a set of optimized operational parameter values for decontouring operations 504 perform smoothen operations on the predicted image to derive a smoothened image 506 apply a residual mask to the predicted image and the smoothened image to derive a decontoured image 508 encode the set of optimized operational parameter values into a part of a multi-layer video signal 510

FIG. 5A extract a set of optimized operational parameter values from a multi-layer video signal 552 perform smoothen operations on a predicted image to derive a smoothened image 554 apply a residual mask to the predicted image and the smoothened image to derive a decontoured image 556 reconstruct a version of an original image based at least in part on the decontoured image 558

FIG. 5B

IMAGE DECONTOURING IN HIGH DYNAMIC RANGE VIDEO PROCESSING

CROSS REFERENCE TO RELATED APPLICATIONS

This application claims the benefit of priority to U.S. Patent Application Ser. No. 62/026,281 filed Jul. 18, 2014, which is incorporated herein by reference in its entirety.

TECHNOLOGY

The present invention relates generally to image processing, and in particular, to encoding, decoding, and representing video images with high dynamic range.

BACKGROUND

The terms "VDR" or "visual dynamic range" and "EDR" or "enhanced dynamic range" as used herein may refer to a dynamic range (e.g., 10,000 nits, 12,000+ nits, etc.) wider than a relatively low dynamic range such as a standard dynamic range (SDR), an intermediate high dynamic range (e.g., 1000 nits, 2000 nits, etc.), etc., and may include, but is not limited to, a wide dynamic range up to the instantaneously perceivable dynamic range and color gamut which human vision can perceive at an instant. Multiple layers may be used to deliver video data from an upstream device such as a multi-layer video encoder to downstream devices. For example, visual dynamic range (VDR) video data can be carried in the combination of a base layer and an enhancement layer (EL) of the multiple layers for viewing experience of VDR displays. BL image data may be encoded with low or partial dynamic range (e.g., SDR, an intermediate high dynamic range, etc.) image data derived from VDR images. EL image data may be encoded with residual image data which, along with image data predicted from the BL image data enables a downstream recipient system to reconstruct a version of the VDR images.

Different code words mapped from the VDR images may be collapsed into a same value in the BL image data representing a relatively low dynamic range such as an SDR image, an intermediate high dynamic range image, etc., at an upstream device. Textual variations and image details represented in the VDR images may be lost in the BL image data. When the recipient system performs a prediction operation from low bit depth BL image data to high bit depth VDR image data, contouring artifacts often occur in the high bit depth VDR image data as a result of one-to-many mappings in the prediction operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3 illustrates selecting optimal operational parameter values;

FIG. 5A and FIG. 5B illustrate example process flows; and

DESCRIPTION OF EXAMPLE EMBODIMENTS

Figure 1:
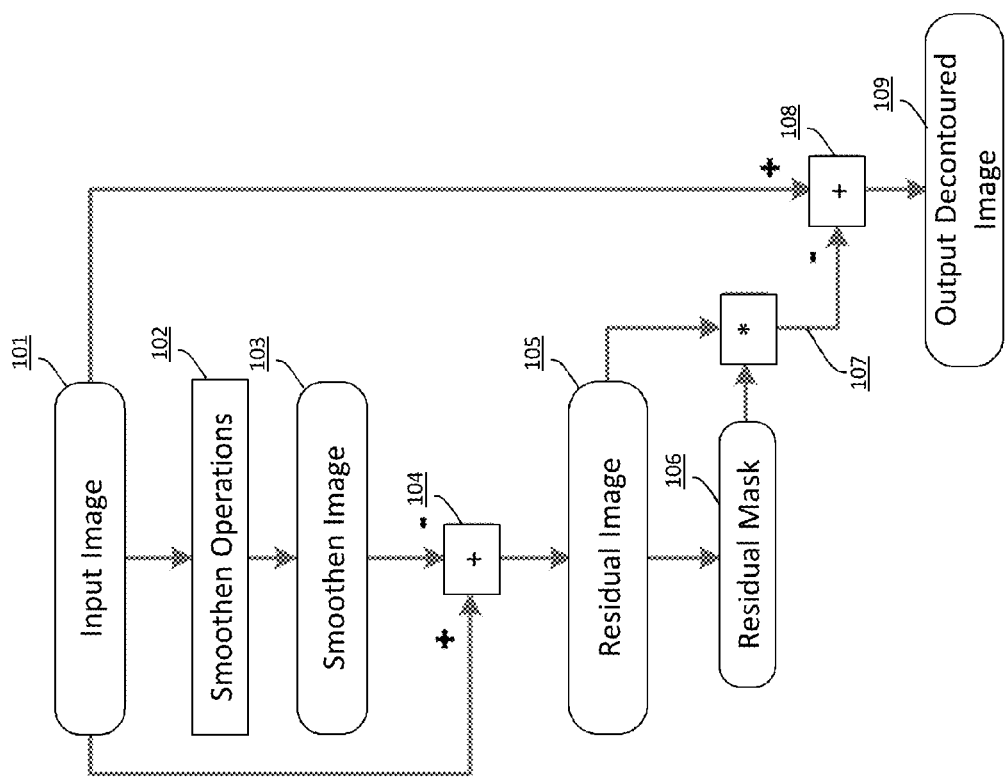
FIG. 1 illustrates using a smoothen operator and a residual mask for decontouring operations.

Example embodiments, which relate to encoding, decoding, and representing video images using a multi-layer codec, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. DECONTOURING FILTERING
3. SMOOTHEN OPERATIONS AND SELECTION/MASKING OPERATIONS
4. SMOOTHNESS THRESHOLDS AND INTERPOLATION ERRORS
5. OPTIMAL VALUES FOR OPERATIONAL PARAMETERS
6. MULTI-LAYER VIDEO ENCODING
7. MULTI-LAYER VIDEO DECODING
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

In some embodiments, multi-layer codecs may be used to generate or process a media signal comprising compressed images (e.g., video images) for a wide variety of displays (e.g., VDR displays, etc.). To provide superior visual quality on a wide variety of wide and low dynamic range displays, video content to be released to downstream devices can be quantized and encoded by a multi-layered codec implementing filtering techniques as described herein.

As used herein, the term "multi-layer codec" may refer to a multi-layer encoder or decoder that implements a structure of multiple layers in an audio visual signal (e.g., a bitstream, a broadcast signal, a media file, etc.). The multiple layers comprise a base layer and one or more enhancement layers. The base and enhancement layers comprise image data derived from the same source images. Image data in the base layer contains compressed image data of a low or partial dynamic range, which may not be optimized for rendering on displays of a relatively low dynamic range such as a standard dynamic range, an intermediate high dynamic range, etc. Image data in the multiple layers in combination contains compressed images of a wide dynamic range, which can be decoded and viewed on displays of a relatively wide dynamic range such as a visual dynamic range or VDR.

A multi-layer codec as described herein may be implemented with two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer.

Codecs implementing techniques as described herein may be further configured to include inter-layer prediction capabilities to fully exploit statistical redundancy between base layer (BL) image data and original input image data. EL image data may (possibly only) carry residual (or differential) image data, instead of carrying a large amount of wide dynamic range image data without exploiting correlations and statistical redundancy in image data of different layers.

Prediction from lower bit depth image data to higher bit depth image data often brings about contouring artifacts in the high bit depth VDR image data, because of one-to-many (e.g., 8-bit in SDR to 12+ bit VDR, an intermediate high dynamic range to a higher dynamic range, etc.) mappings during inverse mapping in such a prediction.

Techniques as described herein may be used to enhance prediction of wide or high dynamic range image data based on relatively low bit depth (e.g., 8 bits, etc.) image data in a base layer and reduce false contouring artifacts in reconstructed wide or high dynamic range (e.g., 12+ bits VDR, etc.) images. These techniques can improve bit depth expansion in the false contouring areas (or stair wise areas) significantly both perceptually and objectively.

In some embodiments, decontouring techniques as described herein include smoothen operations performed by a smoothen operator, selection/masking operations between smoothened pixel values and unsmoothened pixel values, etc. False contouring artifacts can be effectively removed by performing decontouring filtering in the predicted image data using the smoothen operations, the selection/masking operations, etc.

In some embodiments, the selection/masking operations between smoothened pixel values and unsmoothened pixel values are performed with a residual mask. Such a residual mask can be generated based on differences between a predicted image predicted from a lower dynamic range image (e.g., an SDR image, an intermediate dynamic range image, etc.) that is mapped from an original higher dynamic range (e.g., VDR, etc.) image and the original higher dynamic range image. Distortions and differences in luminance levels may be computed for individual pixels between smoothened values and unsmoothened values in the original VDR image. A smoothness threshold related to stair step sizes of luminance levels in flat areas or smooth areas can be used to prevent unnecessary smoothening in image areas with textual variations and image details, and to generate masking values (e.g., binary values 0 and 1, etc.) in the residual mask that determine whether smoothened values or unsmoothened values should be used in individual pixels, individual image portions, etc.

Examples of smoothen operations include, but are not limited to only, any of: smoothening operations comprising resampling operations, smoothening operations other than resampling operations, such as sparse filtering, blur filtering, etc.

In some embodiments, decontouring operational data (e.g., operational parameters used in smoothen operations, selection/masking operations, etc.) may be generated by an upstream encoder and transmitted by the upstream encoder to downstream decoders. For example, smoothen operations and selection/masking operations as described herein can be implemented as in-loop operations in a video encoder as described herein to generate metadata comprising operational parameters to be transmitted to and used by a video decoder.

Additionally, optionally, or alternatively, techniques as described herein can be used as post-processing operations by a downstream decoder to alleviate the contouring artifacts. For example, smoothen operations, selection/masking operations, etc., may be implemented by downstream decoders as post-processing operations. Thus, in some embodiments, smoothen operations and selection/masking operations as described herein may not be performed by an upstream encoder, but rather are implemented and performed by a video decoder as described herein without receiving metadata comprising operational parameters for the decontouring operations from an upstream video encoder.

Techniques as described herein can be implemented in backward compatible multi-layer video codecs. A backward compatible (BC) multi-layer video codec supports encoding or decoding a video signal in which BL data comprises SDR images optimized for viewing on SDR displays.

Data needed for other applications (including but not limited to those not related to filtering operations, etc.) may also be included with base layer and enhancement layer image data to be delivered from an upstream device to a downstream device. Additional features and/or orthogonal features may be supported by the base and enhancement layers as described herein.

In some example embodiments, mechanisms as described herein form a part of a media processing system, including but not limited to any of: video processing system, studio system, streaming server, cloud-based content service system, a handheld device, game machine, television, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Decontouring Filtering

Techniques (e.g., methods, algorithms, process flows, etc.) as described herein can be used by a multi-layer encoder to encode source video content into a multi-layer video signal that preserves visual details of the source video content in BL image data as well as in the combination of BL and EL image data. In some embodiments, the source video content is originally encoded with the source code words in a source encoding format (e.g., as defined by a VDR specification, etc.) based on video encoding techniques (e.g., VDR encoding techniques developed by Dolby Laboratories, Inc., San Francisco, Calif., etc.).

The multi-layer video signal generated by a multi-layer encoder as described herein can be transmitted directly or indirectly to or received by a wide variety of downstream devices including but not limited to, any of: display systems with multi-layer decoders, display systems with base-layer decoders, etc.

A downstream device (e.g., a multi-layer decoder, etc.) that supports relatively wide dynamic range display operations can derive and/or render a wide dynamic range version of the source video content based on the received multi-layer video signal. A downstream device (e.g., a BL decoder, etc.) that supports relatively low dynamic range display operations can derive and/or render a decoded low dynamic range version with visual details of the source video content based on BL image data of the received multi-layer video signal.

It is commonly observed that a backward compatible (BC) video codec tends to show banding artifacts (or false contouring artifacts) for some content (e.g., animation pictures, etc.) in reconstructed wide dynamic range images. Such a video codec may use a base layer (BL) signal of a relatively low bit depth and can only accommodate a relatively small number of possible distinct code words in a luminance channel to which a relatively large number of distinct source code words in the luminance channel from a source video signal may be mapped. In an example, for an 8-bit BL signal, only 256 different code words (which may be fewer in practice) can be used to represent or map source code words in the luminance channel from a source video signal comprising VDR source image content.

This shortcoming in the BL signal may not be easily compensated by an enhancement layer (EL) signal, as in many bit rate assignments, the EL signal is assigned with too low a bit rate to include many small residual values for such compensation.

Although noise injection can be used to effectively remove banding artifacts, resulting noisy visual content may not be perceptually comfortable for viewing, especially in relatively low bit rate cases.

In some embodiments, a video codec as describe herein (e.g., a BC video codec commercially developed by Dolby Laboratories, Inc., California, etc.) may implement decontouring operations based on a difference of smoothened (DoS) image. These decontouring operations can be implemented as in-loop operations, post-processing operations, etc., to alleviate or remove false contouring (or banding) artifacts.

When the techniques as described herein are deployed as in-loop operations, clean images with banding artifacts significantly removed can be (e.g., pleasantly, etc.) presented to viewers.

3. Smoothen Operations and Selection/Masking Operations

Under the techniques as described herein, a smoothen operator, a residual mask, etc., can be used as major components. After prediction operations that generate a predicted high bit depth image (e.g., a predicted VDR image, etc.) from a decoded low bit depth BL image (e.g., a decoded SDR image, a decoded intermediate high dynamic range image, etc.), the smoothen operator can operate on the predicted image to interpolate missing values caused by quantization (e.g., caused by relatively few available quanta in the decoded low bit depth image, etc.) to make the predicted image smooth, since the predicted image is of a bit depth or a code space capable of holding more code words than the decoded BL image for interpolation to alleviate false contouring artifacts. The residual mask can be used to select or choose values between values in the predicted quantized pixels (e.g., before interpolation, etc.) and values in the smoothened predicted pixels (e.g., after interpolation, etc.).

In some embodiments, a video decoder (e.g., a VDR decoder, etc.) is not required to access the original unquantized source image (e.g., a VDR image in a source video signal, etc.) for performing decontouring operations.

In some embodiments, decontouring operations are performed by a video decoder as described herein with metadata comprising operational parameters as received from the video encoder side; thus, computations used to obtain (e.g., optimal, etc.) operational parameters can be avoided on the video decoder side.

Additionally, optionally, or alternatively, in some embodiments, decontouring operations performed by a video decoder as described herein are performed entirely on the video decoder side without receiving metadata comprising operational parameters from the video encoder side. In some embodiments, decontouring operations performed by a video decoder as described herein can be implemented as a stand-alone module in a post-processing pipeline.

FIG. 1 illustrates an example method of using a smoothen operator f (•) and a residual mask M (•) for decontouring operations. In some example embodiments, one or more computing devices or components (e.g., a video encoder, a video decoder, a combination of a video encoder and a video decoder, etc.) may perform this process flow. Techniques as described herein support an approach for jointly selecting (e.g., optimized values of, etc.) operational parameters to be used in the smoothen operator and the residual mask.

For the purpose of illustration only, an input image 101 (e.g., a VDR image, a predicted high bit depth image predicted from a low bit depth image, a decoded image that comprises banding artifacts, etc.) to which the decontouring operations are to be performed is denoted as v.

In block 102, the smoothen operator is applied to the input image (101) to generate a smoothened image 103 as follows:

$$s = f(v) \quad (1)$$

In block 104, a residual image 105 (or a difference image), denoted as r, between the input image (101) and the smoothened image (103) is derived as follows:

$$r = v - s \quad (2)$$

In block 106, the residual image r (105) is masked by a masking operation based on the residual mask M (•) to generate a masked residual image 107, denoted as d, as follows:

$$d = M(r) = M(v-s) \quad (3)$$

In some embodiments, the residual mask M (•) comprises binary values of zeros (0s) and ones (1s), and the masking operation is a multiplication operation that multiplies the binary values in residual mask M (•) with the argument (e.g., r in expression (3), v−s in expression (3), etc.) of the residual mask M (•), as shown in FIG. 1 and expression (3).

In block 108, an output decontoured image (109) is generated as a difference v' between the input image v (101) and the masked residual image d (107) as follows:

$$v'=v-d=v-M(v-s)=v-M(v-f(v)) \quad (4)$$

Banding (false contouring) artifacts often happen in flat areas, where there exist many stairs (quantization steps). To remove those banding artifact, it is important to fill replacement values in missing real values (e.g., that had existed in an original VDR source image, etc.) that were lost in quantization (e.g., in a low bit depth image derived from the original VDR source image, etc.). In some embodiments, these replacement values (e.g., to be filled in a predicted high bit depth image predicted from the low bit depth image, etc.) may be smoothened values interpolated from neighboring stairs.

Figure 2:
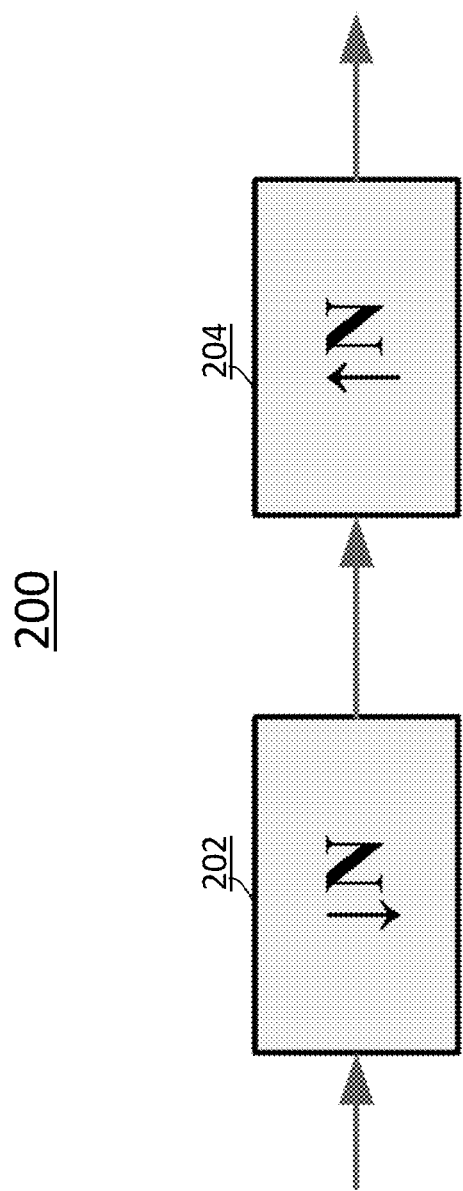
FIG. 2 illustrates smoothen operations comprising resampling operations.

In some embodiments, generation of the smoothened values can be accomplished by a smoothen operator (e.g., f (•), etc.) that implements resampling operations such as downsampling operations, upsampling operations, etc., on a high bit image predicted from the low bit depth image. In some embodiments, FIG. 2 illustrates an example smoothen operator in the form of a cascade operator 200 comprising a downsampling operator 202 followed by an upsampling operator 204. In some embodiments, one or both of the downsampling operator 202 and the upsampling operator 204 can be 2D separable or alternatively 2D non-separable. In some embodiments, one or both of the downsampling operator 202 and the upsampling operator 204 can be performed with respect to a resampling factor N (e.g., a scaling factor used in a resampling operation such as downsampling and upsampling, etc.).

A relatively small value (e.g., N=2, 4, etc.) can be selected for the resampling factor N in resampling operations (e.g., 202, 204, etc.). False contouring may still exist after the resampling operations performed with relatively small values of the resampling factor, while computation costs to perform these resampling operations could be relatively low.

On the other hand, a relatively large value (e.g., N=64, etc.) can be selected for the resampling factor N in the resampling operators (e.g., 202, 204, etc.). False contouring can be effectively removed by the resampling operations performed with relatively large values of the resampling factor. However, significant distortion and relatively high computation costs may be introduced by these resampling operations.

Techniques as described herein can be used to identify flat areas in one or more high bit depth images for the purpose of selecting an optimal value for the resampling factor N. In some embodiments, the optimal value for the resampling factor N is determined as the largest possible value for the resampling factor N provided that distortions introduced by the resampling operations are no larger than (1+δ) times a stair step size in those flat areas, where δ is a numeric scaling factor representing a maximum allowable error in proportion to the stair step size in those flat areas.

In some embodiments, additionally, optionally, or alternatively, a sparse FIR filter such as a hardware efficient FIR filter, etc., can be used at least as a part of the smoothen operator to remove banding artifacts in a high bit depth image (e.g., that is predicted from a low bit depth image that lost original real values in quantization, etc.). Some examples of a sparse FIR filter are described in the U.S. Provisional Patent Application No. 61/885,377, filed on Oct. 10, 2013, titled "Hardware efficient sparse FIR filtering in video codec," the content of which is incorporated by reference for all purposes as if fully set forth herein. In some embodiments, a smoothen operator implementing downsampling and upsampling performs better than a smoothen operator implementing sparse FIR filtering, as the former smoothen operator tends to use finer filtering processes and preserve more object structures than the latter.

In some embodiments, additionally, optionally, or alternatively, a blur filter can be used at least as a part of the smoothen operator to remove banding artifacts in a high bit depth image (e.g., that is predicted from a low bit depth image that lost original real values in quantization, etc.). For example, a blur operator, such as one implementing convolution of a 2-D (separable or non-separable) low pass kernel, etc., may be used to generate smooth area over flat areas or stair wise areas.

For the purpose of illustration only, it has been described that resampling operations, sparse FIR filtering, blur filtering, etc., can be used to perform smoothen operations. It should be noted that in various embodiments, other operators, algorithms, filtering, etc., can also be used for smoothen operations as described herein. For example, an operator, such as an edge preserved filter, a guided filter, etc., may also be used in smoothen operations as described herein.

4. Smoothness Thresholds and Interpolation Errors

The smoothened image s in expression (1) has smooth values in flat areas, but edges and/or non-low frequency textures (e.g., medium frequency textures, high frequency textures, etc.) may be blurred in the smoothened image. As the human visual system (HVS) is sensitive to image details as represented by the edges and/or non-low frequency textures, image data in the edges and/or non-low frequency textures existing before the smoothening operations should be preferably preserved. It is observed that differences (r=v−s) between an input image with banding artifacts and a smoothened image derived from the input image are often of relatively small values in the flat areas and/or stair wise areas, whereas the differences (r=v−s) are often of relatively large values in the non-flat areas. This is caused by the fact that the smoothened image has only relatively low frequency components as compared with the input image or the unsmoothened image.

Techniques as described herein can be used to determine whether to use values in specific areas of the smoothened image depending on magnitudes of residual values in the specific areas. This can be done by constructing an appropriate residual masking operation such as M (•) as discussed above. In some embodiments, the residual masking operation as represented by a residual mask can be performed with a threshold. More specifically, if the magnitude of a residual value at a specific pixel is relatively large (e.g., larger than the threshold, etc.), it is implied that the pixel may be in a high texture area, and that the smoothened value in the pixel should not be used. If the magnitude of a residual value at a specific pixel is relatively small (e.g., no larger than the threshold, etc.), it is implied that the pixel may be in a flat area and/or stair wise area, and that the smoothened value in the pixel should be used.

In various embodiments, values (e.g., Boolean values, binary values of 0 and 1, etc.) in the residual mask may be set for individual pixels, individual pixel blocks, individual image portions, etc. For the purpose of illustration only, the residual mask is set for individual pixels, in which a value of one (1) at a pixel indicates a selection of a smoothened value (e.g., in the smoothened VDR image s as indicated in expression (1), etc.), a value of zero (0) at a pixel indicates a selection of an unsmoothened input value in an input image (e.g., from which the smoothened VDR image s as indicated in expression (1) is derived, etc.). Unsmoothened input values refer to input values that exist before the smoothen operation as described herein is applied.

In some embodiments, individual values in the residual mask (e.g., M (•), etc.) can be set to binary values (e.g., 0 or 1) generated by the right hand side (RHS) of the following expression:

$$M(\bullet)=r(i,j) \leq \Delta \qquad (5)$$

where $\Delta$ represents a smoothness threshold. If a residual value at a pixel (i, j) is no greater than the smoothness threshold $\Delta$ (or the value in the residual mask at the pixel is evaluated to one), the smoothened value is selected (e.g., M(i,j)=1). On the other hand, if the residual value at the pixel (i, j) is greater than the smoothness threshold $\Delta$ (or the value in the residual mask at the pixel is evaluated to zero), the unsmoothened input value is selected (e.g., M(i,j)=0).

In some embodiments, the smoothness threshold $\Delta$ can be set globally, for example, as a fixed value such as $\Delta$=0.001, etc.

In some embodiments, the smoothness threshold $\Delta$ for a pixel (i, j) can be set for a specific 2D area containing neighboring information of the pixel (i, j). In a particular embodiment, the smoothened value is adopted only when the neighbor of the pixel in the specific 2D area is smooth enough. Specifically, the average value of that pixel's neighbors' absolute residual values may be computed. If the average value is larger than $\Delta$ (e.g., $\Delta$=0.25/256, etc.), the unsmoothened input value at the pixel is selected. On the other hand, if the average value is no larger than $\Delta$, the smoothened input value at the pixel is selected. In an example embodiment, the average value can be computed as follows:

$$\bar{r}(i, j) = \frac{1}{(2N+1)^2} \sum_{\substack{-N \leq m \leq N \\ -N \leq n \leq N}} |r(i-m, j-n)| \qquad (6)$$

Accordingly, individual values in the residual mask can be set to binary values (e.g., 0 or 1) generated by the right hand side (RHS) of the following expression:

$$M(r(i,j))=(\bar{r}(i,j)) \leq \Delta \qquad (7)$$

The output image after decontouring operations as described herein can be given as follows:

$$\tilde{r}(i,j)=M(r(i,j))^*r(i,j) \qquad (8)$$

In some embodiments, instead of using an overall 2D area-based threshold as the smoothness threshold, separable thresholds can be used as the smoothness threshold in separate dimensions. For example, a first separable threshold may be used as the smoothness threshold in an individual row, whereas a second separable threshold may be used as the smoothness threshold in an individual column.

In some embodiments, luminance levels in a predicted high bit depth image or in a salient portion of such an image can be used to set a smoothness threshold as described herein. For example, code values in luminance channels of the image can be mapped into an ordered sequence of corresponding luminance levels. This mapping from the code values to the corresponding luminance levels may be represented by a lookup table (LUT) using the code values as keys (e.g., a lookup operation can be made based on a code value as the key, etc.).

In some embodiments, instead of setting the smoothness threshold to a fixed value (e.g., $\Delta$=0.25/256, etc.), the smoothness threshold $\Delta$ may be set as the largest difference value (or stair step size) of luminance levels among all difference values of adjacent luminance levels in the ordered sequence of the corresponding luminance levels mapped by the code values in the luminance channel of the predicted high bit depth image, as follows:

$$\Delta = \max_{\forall i} |L(i+1) - L(i)| \qquad (9)$$

Additionally, optionally or alternatively, $\Delta$ can be set as the average difference value of luminance levels among all difference values of adjacent luminance levels in the ordered sequence of the corresponding luminance levels mapped by the code values in the luminance channel of the predicted high bit depth image, as follows:

$$\Delta = \underset{\forall i}{\mathrm{mean}} |L(i+1) - L(i)| \qquad (10)$$

Additionally, optionally or alternatively, $\Delta$ can be adaptively set based on a predicted luminance level. For example, if a pixel has a (e.g., current, etc.) predicted luminance value L(i), $\Delta$ can be set to the larger of, or the maximal difference between, two nearby luminance levels (in the ordered sequence of luminance levels) in reference to the predicted luminance value L(i), as follows:

$$\Delta = \max\{|L(i)-L(i-1)|,|L(i+1)-L(i)|\} \qquad (11)$$

This adaptive method of setting a smoothness threshold $\Delta$ can ensure interpolation errors to be capped to a stair step size in reference to a current predicted luminance value L(i). However, this method may bring higher computation complexity than otherwise.

In addition to using a smoothness threshold such as $\Delta$ discussed above, other ways of determining image complexity at specific pixels and for selecting between smoothened values and unsmoothened input values can be used. For example, local complexity measures such as those based on standard deviation (e.g., of pixel values over a supporting pixel area, etc.), local range filter (e.g., maximum, minimum, other group values of pixel values over a supporting pixel area, etc.), local entropy, etc., can be used in determining whether smoothened values should be used in place of unsmoothened input values.

5. Optimal Values for Operational Parameters

Techniques as described herein can be used to select operational parameters optimized for both smoothen operator and residual mask. These operational parameters enable removing or reducing banding artifacts at the same time introducing relatively small distortion if any. In some embodiments, a smoothness threshold $\Delta$ can be used as a constraint in selecting operational parameters for the smoothen operator. Specifically, a residual mask can be specifically set to limit maximal distortions introduced by smoothen operations in any given image area of an image (e.g., a predicted high bit depth image, etc.) to no greater than the smoothness threshold $\Delta$, which may be set as one of a maximum stair step size as in expression (9), an average stair step size as in expression (10), or an adaptive maximal stair step size as in expression (11), etc.

It is observed that given a Δ, as a resampling factor N to be used in resampling operations increases, under a corresponding residual mask, a decreasing number of image areas in an image are subjected to smoothen operations performed by the smoothen operator. Consequently, while image areas subjected to the smoothen operations with a large N have a relatively high confidence that these image areas indeed had false contouring areas, more image areas remain having false contouring, as the large N represents a relatively stringent requirement for subjecting image areas to smoothen operations. More image areas may miss out for smoothen operations with the large N.

On the other hand, given a Δ, when a resampling factor N decreases, under a corresponding residual mask, an increasing number of image areas in an image are subjected to smoothen operations performed by the smoothen operator. Consequently, false contouring may not be effectively removed as the image areas being subjected to the smoothen operations with a small N have a relatively low confidence that these image areas indeed had false contouring areas. Distortions may also be introduced to more image areas that should not have been subjected to the smoothen operations when the small N is used. In addition, for image areas that indeed have false contouring, interpolation operations performed under the small N may provide too small modifications to effectively remove the false contouring.

In some embodiments, when the original unquantized image (e.g., a source VDR image in an input signal to a video encoder as described herein, etc.) is available for comparison purposes, actual distortions between a smoothened high bit depth image and the original unquantized image can be computed and estimated (e.g., in in-loop operations of a video encoder, etc.) with a high confidence level and used to determine optimized values for operational parameters. For example, optimal operational parameter values can be selected to generate a residual mask that prevents large distortion from smoothen operations while at the same time applies masking operations more accurately than otherwise.

FIG. 3 illustrates an example method of selecting optimal operational parameter values. For the purpose of illustration only, an optimal value for a resampling factor N (or a scaling factor) need be determined for resampling operations (e.g., downsampling and upsampling operations, etc.).

In block 302, image areas with a high confidence level to have false contouring are determined in an image (e.g., a predicted high bit depth image, etc.). In some embodiments, these image areas can be determined using the highest available value for the resampling factor N. Examples of the highest available value for the resampling factor include but are not limited to only, any of: the maximum value of an allowable value range for the resampling factor, a fixed value such as 64, a preconfigured value, a default value that may or may not be able to override at runtime, etc.

A residual (or difference) image between a smoothened image (e.g., derived from a predicted high bit depth image, etc.) with this highest available value of the resampling factor N and an original unquantized image (e.g., from which a quantized image used to derive the predicted high bit depth image is derived, etc.), as follows:

$$r_{N_{max}}(i,j) = v(i,j) - s_{N_{max}}(i,j) \quad (12)$$

Image areas, where each pixel around which its neighbors' average value of the residual as computed in expression (12) is smaller than the Δ, is determined, as follows:

$$\Omega = \{(i,j) | r_{N_{max}}(i,j) \leq \Delta\} \quad (13)$$

where the images areas are collectively denoted as a set Ω. These image areas computed with the largest possible N in Ω represent high confidence image areas (or collectively a confidence area in short) for flat areas (e.g., having false contouring, etc.). As discussed, the smoothness threshold Δ may be set as one of a maximum stair step size as in expression (9), an average stair step size as in expression (10), or an adaptive maximal stair step size as in expression (11), etc. In some embodiments, the smoothness threshold Δ can be image-dependent, content dependent, scene-dependent, etc. In some embodiments, the smoothness threshold Δ can be determined by way of differences between luminance levels in a LUT (e.g., as generated from an input image, etc.).

In block 304, smoothness measures with a plurality of different sets of candidate operational parameter values (e.g., candidate values of the resampling factor in resampling operations, etc.) are determined with respect to the high confidence image areas for flat areas (or flat image areas) in Ω.

For each set of candidate operational parameter values in the plurality of different sets of candidate operational parameter values (e.g., N=2, 4, 8, 16, 32, etc., of the sampling factor N), the image (e.g., a predicted high bit depth image with false contouring, etc.) is smoothened using that set of candidate operational parameter values. The smoothness measures such as average local entropy of the smoothened image within the high confidence image areas for flat areas in Ω can be computed. In the case of local entropy as the smoothness measures, the quantized image giving rise to the image consists of a relatively small number of distinct code words in the image; thus, the local entropy of the quantized image or the image before smoothen operations should be relatively small. In contrast, after the smoothen operations that interpolate data/values in the image area in Ω, the number of distinct code words increases; thus, the entropy of the image after the smoothen operations should increase.

In some embodiments, the local entropy can be computed by a function that is the same as or similar to the entropyfilt (•) function in MATLAB, and may be denoted as $E_N$.

Let $p_{i,j}^N(k)$ denote the probability of code word (k) in a local window W×W (e.g., 9×9, etc.) around pixel (i,j), where N is a given candidate value of the resampling factor. The local entropy $LE_{i,j}^N$ is defined as follows:

$$LE_{i,j}^N = -\sum_k p_{i,j}^N(k) \log 2(p_{i,j}^N(k)) \quad (14)$$

The average local entropy over the confidence area (the image areas in Ω) can be computed as follows:

$$E_N = \frac{\sum_{(i,j) \in \Omega} LE_{i,j}^N}{|\Omega|} \quad (15)$$

For the purpose of illustration only, it has been illustrated that smoothness measures can be determined based on local entropies. In various embodiments, smoothness measures such as mean squared error (MSE), peak to signal noise ratio (PSNR), etc., other than local entropy, can also be used for selecting an optimal value of operational parameters (e.g., the resampling factor N, etc.) in smoothen operations (e.g., resampling operations, sparse FIR filtering, blur filtering, etc.). One or more of smooth measures as described herein may access the original unquantized image (e.g., in a source signal to a video encoder, etc.).

In block 306, based on the one or more smoothness measures, a set of optimal operational parameter values is selected from the plurality of different sets of candidate operational parameter values. For example, in the case of local entropy as the smoothness measures, after having all $E_N$ for all candidate values of the resampling factor N, the optimal value $N_{opt}$ of the resampling factor N can be set to be the candidate value that correspond to the largest value of the local entropy $E_N$, as follows:

$$N_{opt} = \underset{\{N\}}{\mathrm{argmax}} \{E_N\} \quad (16)$$

Additionally, optionally, or alternatively, in some embodiments, an optimal value of a resampling factor N used for smoothen operations is determined by checking which candidate value of N provides a mask area (e.g., comprising the most numerous pixels at which a smoothened value is selected, etc.)—based on a smoothness threshold Δ—that is close to the total size of detected false contouring areas F. Given such an N (e.g., a candidate value among a plurality of candidate values, etc.) and Δ, a mask $\Omega_N$ can be computed. The optimal value of the resampling factor N can be selected to be a candidate value at which pixel counts in a corresponding mask $\Omega_N$ are closest to pixel counts in the false contouring areas F, as follows:

$$N^{opt} = \underset{\{N\}}{\mathrm{argmin}}(\mathrm{abs}(|F| - |\Omega_N|)) \quad (17)$$

In some embodiments, the false contouring areas can be detected based on methods similar to those as described in the U.S. Provisional Patent Application No. 62/010,908, filed Jun. 11, 2014, titled "Efficient transcoding for backward-compatible VDR codec," which is incorporated herein by reference in its entirety.

Additionally, optionally, or alternatively, in some embodiments, a selection of an optimal value of a resampling factor N can be made based on a determination of sizes of mask areas that are sufficiently flat (e.g., in reference to a lower bound, etc.). For example, given N and Δ, a mask area $\Omega_N$ can be computed. A smoothness measure $s(\Omega_N)$ can then be computed for each mask area $\Omega_N$. An optimal value of a resampling factor N used for smoothen operations is determined by checking which candidate value of N provides the largest mask area (e.g., comprising the most numerous pixels at which a smoothened value is selected, etc.) that satisfies a targeted smoothness constraint $s_T$, as follows:

$$N^{opt} = \underset{\{N\}}{\mathrm{argmin}}(|\Omega_N|) \quad (18)$$

subject to $$s(\Omega_N) \leq s_T$$

In some embodiments, a goal for selecting optimal operational parameter values is to find the largest mask areas to alleviate or remove false contouring, yet still satisfies the targeted smoothness constraint in that mask area. It should be noted that in some embodiments, a relatively large mask area corresponding to a relatively small N may be relatively ineffective to remove false contouring and that conversely, a relatively small mask area corresponding to a relatively large N may be relatively effective to remove false contouring. Thus, the goal is to make smoothening or removing false contouring as effective as possible in as large a mask area as possible.

Other methods of determining optimal values of operational parameters for smoothen operations such as those related to the human visual system, just noticeable difference (JND), etc. can also be used in various embodiments. For example, those operational parameters can be chosen to avoid as many distortions that violate JND as possible.

6. Multi-Layer Video Encoding

Figure 4A:
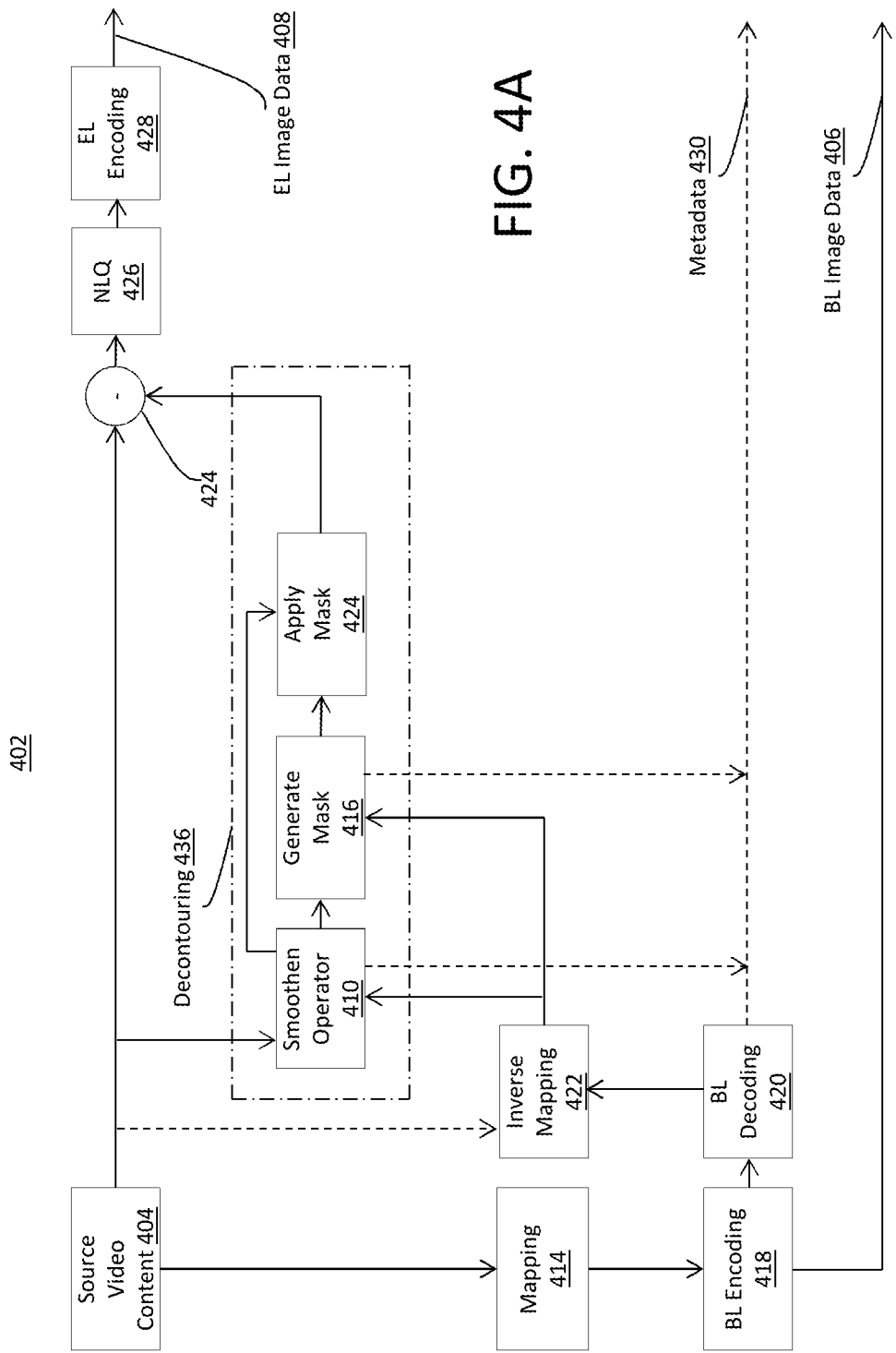
FIG. 4A and FIG. 4B illustrate example video encoder and decoder.
Figure 4B:
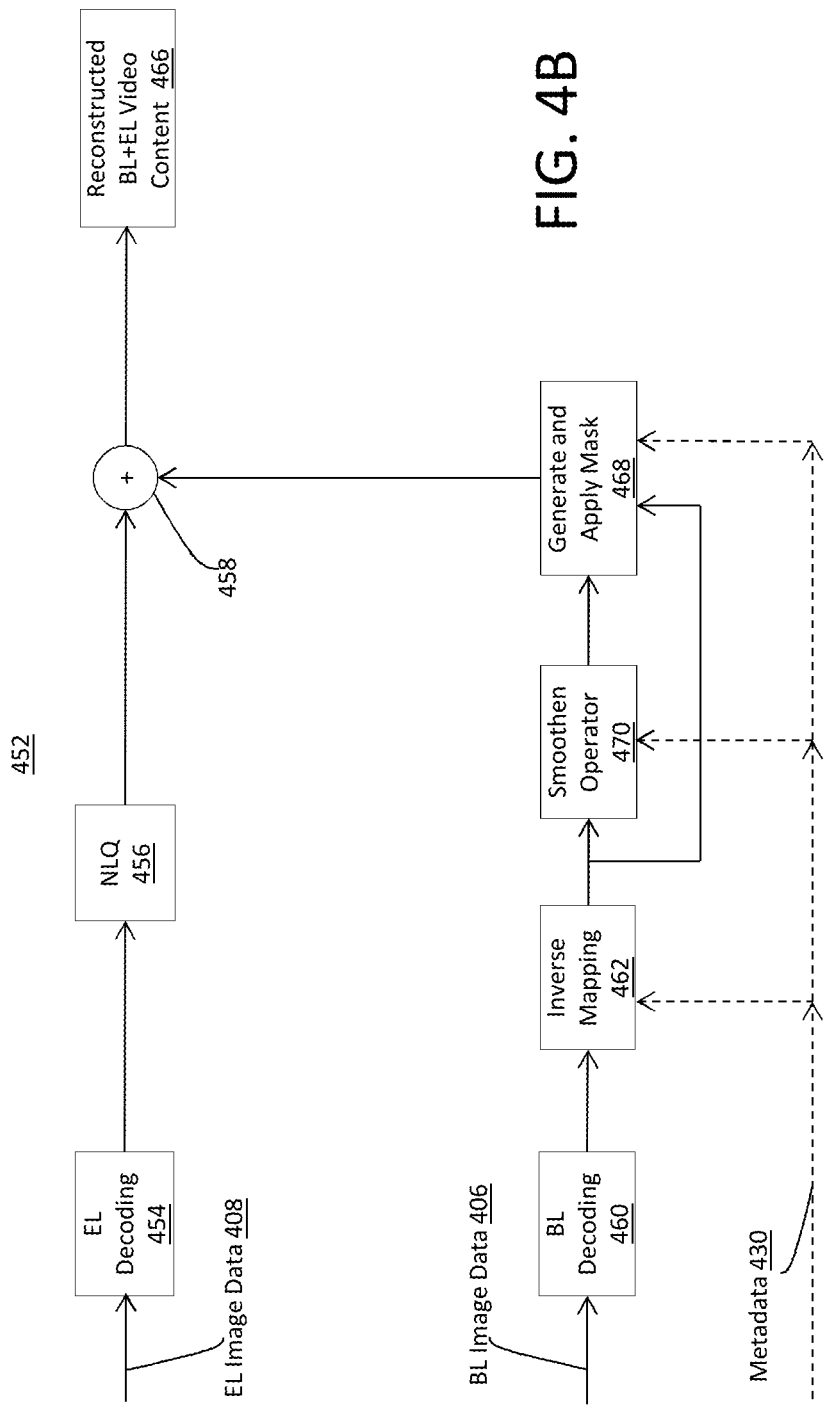

A multi-layer video signal (e.g., coded bitstream, etc.) comprising a base layer and one or more enhancement layers can be used by an upstream device (e.g., a multi-layer encoder 402 of FIG. 4A, etc.) to deliver video content encoded to downstream devices (one of which may be, for example, a multi-layer decoder 452 of FIG. 4B, etc.). In some embodiments, the video content delivered by the multiple layers comprises BL image data (e.g., 406 of FIG. 4A, FIG. 4B, etc.) of a relatively low bit depth and EL image data (e.g., 408 of FIG. 4A, FIG. 4B, etc.) complementary to the BL image data. Both the BL image data (406) and the EL image data (408) are derived/quantized from the relatively high bit depth (e.g., 12+ bit VDR, etc.) source video content (404).

In some embodiments, the BL image data (406) is placed in a base layer container (e.g., an 8-bit YCbCr 4:2:0 container, etc.). In some embodiments, the EL image data (408) comprises residual image data of the (e.g., VDR, etc.) source video content (404) relative to predicted image data generated from the BL image data (406). In some embodiments, the EL image data (408) is placed in one or more enhancement layer containers (e.g., one or more 8-bit residual data containers, etc.). The BL image data (406) and the EL image data (408) may be received and used by the downstream devices (e.g., 452 of FIG. 4B, etc.) to reconstruct a relatively high bit depth (e.g., 12+ bits, etc.) decoded version (e.g., a perceptually decoded VDR version, etc.) of the (e.g., VDR, etc.) source video content (404).

As used herein, the term "bit depth" refers to the number of bits provided in a coding space that provides available code words to encode or quantize image data; an example of low bit depth is 8 bits; an example of high bit depth is 12 bits or more. In particular, the term "a low bit depth" or "a high bit depth" does not refer to the least significant bits or the most significant bits of a code word.

In an example embodiment, the multi-layer encoder (402) is configured to receive the (e.g., VDR, etc.) source video content (404) comprising a sequence of input VDR images. The sequence of input VDR images represents one or more scenes each of which comprises a plurality input images in the sequence of VDR images. As used herein, an "input VDR image" generally refers to wide or high dynamic range image data that may be used to derive a VDR version of a source image (e.g., a scene-referred image captured by a high-end image acquisition device, etc.). An input VDR image may be in any color space that supports a high dynamic range color gamut. In some embodiments, the input VDR image is the only input, relative to the source image, that provides image data for the VDR image encoder (402) to encode; input image data, relative to the source image, for base layer processing under techniques as described herein may be generated based on the input VDR image using tone mapping and/or quantization techniques.

In an example embodiment, an input VDR image decoded from the (e.g., VDR, etc.) source video content (404) is a 12+ bit YCbCr image in a YCbCr color space. In an example, each pixel represented in the input VDR image comprises code words for all channels (e.g., luminance channel Y, chroma channels Cb and Cr, etc.) defined for a color space (e.g., an YCbCr color space, etc.). Each code word comprises upsampled or downsampled code words for one or more of the channels in the color space.

In an example embodiment, the multi-layer encoder (402) is configured to transform code words of an input VDR image from a first color space (e.g., an RGB color space, etc.) to a second different color space (e.g., a YCbCr color space, etc.).

In an example embodiment, the multi-layer encoder (402) is configured to downsample or upsample an input VDR image in a first sampling format (e.g., in a 4:4:4 sampling format, etc.) to a second different sampling format (e.g., in a 4:2:0 sampling format, etc.).

In an example embodiment, the multi-layer encoder (402) is configured to perform operations related to tone mapping and/or quantization on the source video content (404) to generate the (e.g., 8-bit, etc.) BL image data (406). The operations related to tone mapping and/or quantization include but are not limited to one or more of: mapping operations (414), BL encoding operations (418), etc.

In the mapping operations (414), the multi-layer encoder (402) is configured to use a mapping function to map (e.g., 12 bit+, etc.) input VDR code words in one or more input VDR images in the (e.g., VDR, etc.) source video content (404) into mapped code words in one or more mapped images corresponding to the one or more VDR images. Mapping (414) may apply linear or non-linear high dynamic range to standard dynamic range mapping techniques as known in the art.

The number (e.g., <=256 at a bit depth of 8 bits, etc.) of available code words at the bit depth of the BL image data (406) may not be large enough to accommodate the entire numeric range of the source code words. Thus, a mapped code word in the one or more mapped images may correspond to multiple source code words.

In the BL encoding operations (418), the output of mapping (414) is compressed to be transmitted as coded BL stream 406 to a downstream decoder (e.g., 452). BL Encoding (418) may comprise any known or future video encoder, such as one described by the MPEG-2, MPEG-4, H.264, HEVC, and the like, specifications.

As depicted in FIG. 4A, in an example embodiment, the multi-layer encoder (402) is configured to perform one or more EL operations. The one or more EL operations include but are not limited to, any of: BL decoding operations (420), prediction operation (422), subtraction operations (424), nonlinear quantization operators (426), EL encoding operations (428), a set of decontouring operations (436), etc. In some embodiments, the set of decontouring operations (436) includes, but is not necessarily limited to, any of a smoothen operator (410), a generate mask operation (416), an apply mask operation (424), etc.

In the BL decoding operations (420), the multi-layer encoder (402) is configured to decode the (e.g., 8 bit, etc.) BL image data (406) in the (e.g., 8-bit, etc.) BL image containers back into mapped code words in one or more mapped images that correspond to the one or more input VDR images.

In the prediction, or inverse mapping operation (422), the multi-layer encoder (402) is configured to inversely map the mapped (BL) code words into VDR code words based on an inverse of the mapping (e.g., content mapping, etc.) used in Mapping (414). An example of such a predictor is described in PCT Application with Ser. No. PCT/US2012/033605, filed on Apr. 13, 2012, titled "Multiple Color Channel Multiple Regression Predictor," incorporated herein by reference in its entirety.

In some embodiments, the multi-layer encoder (402) is configured to implement BL-to-EL prediction (e.g., intra and/or inter prediction, etc.) in order to reduce the amount of EL image data that needs to be carried in the EL layers for reconstructing VDR images by a downstream device (e.g., a multi-layer decoder 452 of FIG. 4B, etc.). The multi-layer encoder (402) can generate, based at least in part on the VDR code words obtained through the prediction operation (422), prediction image data (e.g., a predicted high bit depth image, etc.).

In some embodiments, the smoothen operator (410) is configured to perform smoothen operations (e.g., FIG. 1, FIG. 2, FIG. 3, etc.) as described herein. In some embodiments, the smoothen operator (410) is applied to the prediction image data (e.g., a predicted high bit depth image predicted from a SDR image, an intermediate high dynamic range image, etc.) to generate smoothened prediction image data (e.g., a smoothened high bit depth image, etc.). In some embodiments, generation of the smoothened values in the smoothened prediction image data can be accomplished by resampling operations (e.g., downsampling operations, upsampling operations, etc.) implemented by the smoothen operator (410). In some embodiments, as illustrated in FIG. 2, the smoothen operator (410) can be a cascade operator (e.g., 200, etc.) comprising a downsampling operator (e.g., 202, etc.) followed by an upsampling operator (e.g., 204, etc.).

In some embodiments, the generate mask operation (416) is configured to generate a residual mask used in decontouring operations (e.g., FIG. 1, FIG. 2, FIG. 3, etc.) as described herein. In various embodiments, values (e.g., Boolean values, binary values of 0 and 1, etc.) in the residual mask may be set for individual pixels, individual pixel blocks, individual image portions, etc., in the prediction image data In some embodiments, the residual mask (e.g., M (•) in expression (5), etc.) can be set based at least in part on a smoothness threshold $\Delta$.

In some embodiments, the apply mask operation (424) is configured to apply the residual mask to select between smoothened values in the smoothened prediction image data and (e.g., unsmoothened, pre-smoothened, etc.) values in the prediction image data used to generate the smoothened prediction image data.

In some embodiments, high confidence flat image areas are identified from an image (e.g., with a relatively large resampling factor N such as 64, etc.). Operational parameters used in the smoothen operations and selection/masking operations can be optimized by assessing smoothness measures generated by different candidate values of the operational parameters and by choosing a set of optimized values among the different candidate values that minimize the introduction of distortions and enhance the reduction/removal of false contouring.

In the subtraction operations (424), the multi-layer encoder (402) is configured to generate residual values between the VDR code words decoded from the source video content (404) and the VDR code words represented in the prediction image data after decontouring filtering.

Residual values in a specific channel (e.g., a luminance channel, a Y channel, etc.) may be differences produced by the subtraction operations (424) in a logarithmic domain or in a linear domain.

In the non-linear quantization operations (426), the multi-layer encoder (402) is configured to quantize the residual values in a first digital representation (e.g., 12+ bit, etc.) to a second digital representation (e.g., 8-bit, etc.) in a color space (e.g., YCbCr, etc.) using one or more NLQ parameters.

In the EL encoding operations (428), the multi-layer encoder (402) is configured to encode the (e.g., 8-bit, etc.) residual values as generated by the non-linear quantization operations, into the EL image data (408) in an (e.g., 8-bit, etc.) EL image container in a (e.g., 4:2:0, etc.) sampling format. The EL image container in the enhancement layer may be logically separate from the BL image container in the base layer, even though both image containers can be concurrently contained in a single digital video signal (e.g., a single coded bitstream, a single media file, a single broadcast, etc.).

In an example embodiment, the multi-layer encoder (402) outputs the EL image data (408) in the EL image containers as a part of multi-layer video signal to a downstream device (e.g., the multi-layer decoder 452 of FIG. 4B, etc.).

In an example embodiment, the multi-layer encoder (402) outputs metadata (430) comprising some or all of operational parameters used in the operations of the multi-layer encoder (402) as a part of multi-layer video signal to a downstream device (e.g., the multi-layer decoder 452 of FIG. 4B, etc.). In some embodiments, the metadata (430) comprises one or more of operational parameters related to or used in the smoothen operator (410), the generate mask operation (416), and the apply mask operation (424), etc. These operational parameters may include, but are not limited to only, any of: smoothness thresholds, resampling factors, metadata portions defining high confidence image areas for flat areas, one or more smoothness measures, optimal values, stair step sizes in luminance levels, etc. Additionally, optionally or alternatively, the operational parameters in the metadata (430) transmitted to downstream devices include but are not limited to, any of: sparse FIR filter parameters, mapping parameters, clipping parameters, inverse mapping parameters, LUTs, non-linear quantization parameters, NLQ parameters, etc. The metadata (430) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc., California.

For example, LUTs used in determining stair step sizes may be transmitted to downstream devices as a part of the metadata (430). In some embodiments, lookup keys and values corresponding to the lookup keys in a LUT are transmitted to downstream devices as a part of the metadata (430). In some embodiments, at least one LUT may be representable by an analytic function or a multi-segment analytic function. Instead of transmitting lookup keys and values corresponding to the lookup keys in the LUT to downstream devices, parameters defining the analytic function are sent to the downstream devices as a part of the metadata (430), in order to reduce the amount of the metadata (430) in transmission. In some embodiments, parameters in a mapping function used to numerically derive a LUT are transmitted to downstream devices as a part of the metadata (430), instead of transmitting lookup keys and values corresponding to the lookup keys in the LUT. A downstream device can use the parameters to derive the LUT. A video codec specification governing encoding and decoding operations may comprise syntactic elements to pass one or more of parameters as described herein from an upstream device (e.g., the multi-layer encoder 402, etc.) to downstream devices (e.g., the multi-layer decoder 452, etc.).

The EL image data (408), the BL image data (406) and the metadata (430) can be used by the downstream device to generate a decoded version of relatively wide dynamic range (e.g., VDR, HDR, etc.) images that represent the relatively wide dynamic range input images in the source video content (404).

One or more of the operations such as the BL encoding operations (418), the BL decoding operations (420), the EL encoding operations (428), etc., may be implemented using one or more of a plurality of codecs, including, but not limited to, any combination of: H.264/AVC/HEVC, MPEG-2, VP8, VC-1, and/or others.

7. Multi-Layer Video Decoding

A multi-layer video signal (e.g., coded bitstream, etc.) comprising video content can be received by a multi-layer decoder (e.g., 452 of FIG. 4B, etc.). In some embodiments, the video content received by the multi-layer decoder (452) comprises BL image data (e.g., 406 of FIG. 4A, FIG. 4B, etc.) of a relatively low bit depth and EL image data (e.g., 408 of FIG. 4A and FIG. 4B, etc.). In some embodiments, both the BL image data (406) and the EL image data (408) were derived/quantized from the relatively high bit depth (e.g., 12+ bit VDR, etc.) source video content (e.g., 404 of FIG. 4A, etc.). In some embodiments, the multi-layer decoder (452) is configured to receive metadata (430) comprising some or all of operational parameters used in operations that generate the BL image data (406) and the EL image data (408) as a part of the multi-layer video signal. The operational parameters in the metadata (430) include but are not limited to, any of: smoothness thresholds, resampling factors, metadata portions defining high confidence image areas for flat areas, one or more smoothness measures, optimal values, stair step sizes in luminance levels, sparse FIR filter parameters, mapping parameters, clipping parameters, inverse mapping parameters, LUTs, non-linear quantization parameters, NLQ parameters, etc. The metadata (430) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc., California.

In some embodiments, the BL image data (406) is placed in a base layer container (e.g., an 8-bit YCbCr 4:2:0 container, etc.). In some embodiments, the EL image data (408) comprises residual image data of the (e.g., VDR, etc.) source video content (404) relative to predicted image data generated from the BL image data (406). In some embodiments, the EL image data (408) is placed in one or more enhancement layer containers (e.g., one or more 8-bit residual data containers, etc.).

In an example embodiment, the multi-layer decoder (452) is configured to perform decoding operations on the BL image data (406) and the EL image data (408) to generate one or more wide dynamic range (e.g., VDR, etc.) images that represents a reconstructed version (e.g., reconstructed BL+EL video content 466, etc.) of source images in source video content that was used to generate the multi-layer video signal. The decoding operations include but are not limited to one or more of: BL decoding operation (460), inverse mapping operations (462), EL decoding operations (454), non-linear de-quantization operations (456), a smoothen operator (470), a generate and apply mask operation (468), addition operations (458), etc.

In the BL decoding operations (460), the multi-layer decoder (452) is configured to decode the (e.g., 8 bit, etc.) BL image data (406) in the (e.g., 8-bit, etc.) BL image containers into mapped code words in one or more mapped images (e.g., tone-mapped images).

In the inverse mapping operations (462), the multi-layer decoder (452) is configured to inversely map the mapped code words into VDR code words.

In the EL decoding operations (454), the multi-layer encoder (452) is configured to generate (e.g., 8-bit, etc.) residual values by decoding the EL image data (408), which may be in an (e.g., 8-bit, etc.) EL image container in a (e.g., 4:2:0, etc.) sampling format.

In the non-linear de-quantization operations (456), the multi-layer decoder (452) is configured to de-quantize the residual values in a relatively low bit depth digital representation (e.g., 8-bit, etc.) as decoded to a relatively high bit depth digital representation (e.g., 12+ bit, etc.) in a (e.g., YCbCr, etc.) color space using one or more NLQ parameters decoded from the metadata (430).

In some embodiments, the multi-layer decoder (452) is configured to implement BL-to-EL prediction (e.g., intra and/or inter prediction, etc.) in order to reduce the amount of EL image data that needs to be carried in the EL layers for reconstructing VDR images by the multi-layer decoder (452). The multi-layer decoder (452) can generate, based at least in part on the VDR code words obtained through the prediction operation (422), prediction image data (e.g., a predicted high bit depth image, etc.) that comprise the VDR code words to be smoothened by the smoothen operator (470).

In some embodiments, the smoothen operator (470) is configured to perform smoothen operations (e.g., FIG. 1, FIG. 2, FIG. 3, etc.) as described herein. In some embodiments, the generate and apply mask operation (468) is configured to generate a residual mask used in decontouring operations (e.g., FIG. 1, FIG. 2, FIG. 3, etc.) as described herein, and to apply the residual mask to select between smoothened values in the smoothened prediction image data and (e.g., unsmoothened, pre-smoothened, etc.) values in the prediction image data used to generate the smoothened prediction image data.

In the addition operations (458), the multi-layer decoder (452) is configured to generate the reconstructed version of one or more wide dynamic range images based on the residual values generated in the EL decoding operations (454) and the VDR code words generated in the inverse mapping operations (462) after the decontouring operation performed by the smoothen operator (470) and the generate and apply mask operation (468). The reconstructed version of the one or more wide dynamic range images can be outputted to and/or rendered on a display panel, for example, by a (e.g., HDR, VDR, etc.) display system that operates with or includes the multi-layer decoder (452).

In some embodiments, components or modules used in the inverse mapping (462) or the BL decoding operations (460) of the multi-layer decoder (452) may be the same or substantially the same as those used in the inverse mapping (420) or the BL decoding operations (418) of the multi-layer encoder (402).

One or more of the operations performed by the multi-layer decoder (452) may be implemented using one or more of a plurality of codecs, including, but not limited to, any combination of: H.264/AVC/HEVC, MPEG-2, VP8, VC-1, and/or others.

In some example embodiments, different decontouring filters in different color spaces and/or in different color channels may be selected. For example, to alleviate/reduce/remove contouring artifacts (e.g., in smooth areas, etc.) and other artifacts, video signals may be filtered in different color spaces and/or with different decontouring filtering methods. Decontouring operations and/or operational parameter values may be selected on the basis of any of: a frame, multiple frames, a scene, multiple scenes, etc. Decontouring operations as described herein may be performed on an individual channel basis or on two or more channels at the same time.

In some embodiments, a specific decontouring filtering method may be selected based on how well it can alleviate/reduce/remove contouring artifacts in output multi-layer VDR image data while still maintaining high performance and low computational costs on the VDR decoder side, while still minimizing the introduction of distortions in rendered images.

A multi-layer encoder under techniques as described herein may take input VDR image data as the only input for image content to be processed by the multi-layer encoder. While the input VDR image data may be provided to enhancement layer data processing, decontouring filtering, which may be performed on-the-fly (e.g., at the same wire speed at which the input VDR is inputted into the VDR encoder, etc.), may be used to generate input image data to base layer data processing as described herein.

Decontouring filtering as described herein may be performed in one or more different ways. Filtering may be performed globally in which an entire frame or an entire scene is filtered using a single setting (e.g., filter parameters, etc.). Filtering may also be performed on the basis of partition in which each frame is partitioned into a plurality of non-overlapping regions (e.g., areas, etc.) and each non-overlapping region is filtered using its own setting. Filter parameters for a specific non-overlapping region, a specific frame, a specific scene, etc., may be determined based on image content analysis data derived from the specific non-overlapping region, the specific frame, the specific scene, etc. Filtering as described herein may be applied with any of one or more different color spaces used to represent pixel values of images. Examples of color spaces in which filtering as described herein may be applied include, but are not only limited to, any of: RGB color spaces, YCbCr color spaces, YCoCg color spaces, ACES color spaces, or other color spaces.

In some embodiments, a color space in which filtering is applied is kept the same as a color space in which prediction is performed. This may be so in both VDR image encoding process and VDR image decoding process. Color space transformation may also be performed as appropriate if a color space in which image rendering occurs is different from a color space in which filtering occurs.

8. Example Process Flows

FIG. 5A illustrates an example process flow according to an example embodiment of the present invention. In some example embodiments, one or more computing devices or components may perform this process flow. In block 502, a multi-layer video encoder (e.g., 402 of FIG. 4A) determines flat image areas in a predicted image, the predicted image being predicted from a first image mapped from a second image that has a higher dynamic range than the first image.

In block 504, the multi-layer video encoder generates, based at least in part on the flat image areas and the predicted image, a set of optimized operational parameter values for decontouring operations.

In block 506, the multi-layer video encoder performs, based at least in part on the set of optimized operational parameter values for decontouring operations, one or more smoothen operations on the predicted image to derive a smoothened image.

In block 508, the multi-layer video encoder applies, based at least in part on the set of optimized operational parameter values for decontouring operations, a residual mask to the predicted image and the smoothened image to derive a masked residual image.

In block 510, the multi-layer video encoder encodes the set of optimized operational parameter values into a part of a multi-layer video signal that includes the first image.

In an embodiment, the multi-layer video encoder is further configured to encode the residual mask into the multi-layer video signal.

In an embodiment, the multi-layer video encoder is further configured to perform: generating residual values based at least in part on the decontoured image and the second image; applying non-linear quantization to the residual values to generate enhancement layer (EL) image data; and encoding the EL image data into the multi-layer video signal.

In an embodiment, the multi-layer video encoder is further configured to perform: determining one or more image areas with a high confidence level to have false contouring in an image; calculating one or more smoothness measures with a plurality of different sets of candidate operational parameter values with respect to the flat image areas; and selecting, based on the one or more smoothness measures, the set of optimal operational parameter values from the plurality of different sets of candidate operational parameter values.

In an embodiment, base layer (BL) image data derived from the second images is compressed by a first encoder into the multi-layer video signal; enhancement layer (EL) image data derived from the second images is compressed by a second encoder in the multi-layer encoder into the multi-layer video signal.

FIG. 5B illustrates an example process flow according to an example embodiment of the present invention. In some example embodiments, one or more computing devices or components may perform this process flow. In block 552, a multi-layer video decoder (e.g., 452 of FIG. 4B) extracts a set of optimized operational parameter values from a multi-layer video signal that includes a first image mapped from an original image.

In block 554, the multi-layer video decoder performs, based at least in part on the set of optimized operational parameter values for decontouring operations, one or more smoothen operations on a predicted image to derive a smoothened image, the predicted image being predicted from the first image.

In block 556, the multi-layer video decoder applies a residual mask to the predicted image and the smoothened image to derive a masked residual image.

In block 558, the multi-layer video decoder reconstructs a version of the original image based at least in part on the decontoured image.

In an embodiment, the multi-layer video decoder is further configured to extract the residual mask from the multi-layer video signal.

In an embodiment, the first image is encoded as a part of base-layer (BL) image data in the multi-layer video signal.

In an embodiment, the residual mask is constructed by a video decoder based at least in part on the set of optimized operational parameter values for decontouring operations.

In an embodiment, the second image is in a plurality of images that form a scene; image data derived from the plurality of images is encoded in the multi-layer video signal.

In an embodiment, the first image is encoded as a part of base-layer (BL) image data in the multi-layer video signal.

In an embodiment, a decontoured image is generated based on the masked residual image and the predicted image.

In an embodiment, the residual mask comprising binary values; the residual mask is applied to a residual image between the predicted image and the smoothened image through multiplication operations of the binary values in the residual mask.

In an embodiment, smoothen operations as described herein comprises one or more of resampling operations, sparse filtering operations, or blur operations.

In an embodiment, a set of optimized operational parameter values for decontouring operations, as described herein, comprises an optimized value for a scaling factor used in resampling operations. In an embodiment, set of optimized operational parameter values for decontouring operations, as described herein, comprises a smoothness threshold used to generate the residual mask.

In an embodiment, a residual mask as described herein covers an entire area of the predicted image.

In an embodiment, one or more smoothen operations as described herein are performed on pixel values for a specific channel in a plurality of channels of a color space.

In an embodiment, a plurality of channels as described herein comprises one or more of a luminance channel, a chroma channel, a red color channel, a blue color channel, a green color channel, or other primary channels.

In an embodiment, a method, comprises: performing one or more smoothen operations on an input image to generate a smoothened image; subtracting the smoothened image from the input image to derive a residual image; applying a residual mask to the residual image to obtain a masked residual image; subtracting the masked residual image from the input image to derive an output decontoured image; etc.

In various example embodiments, an encoder, a decoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
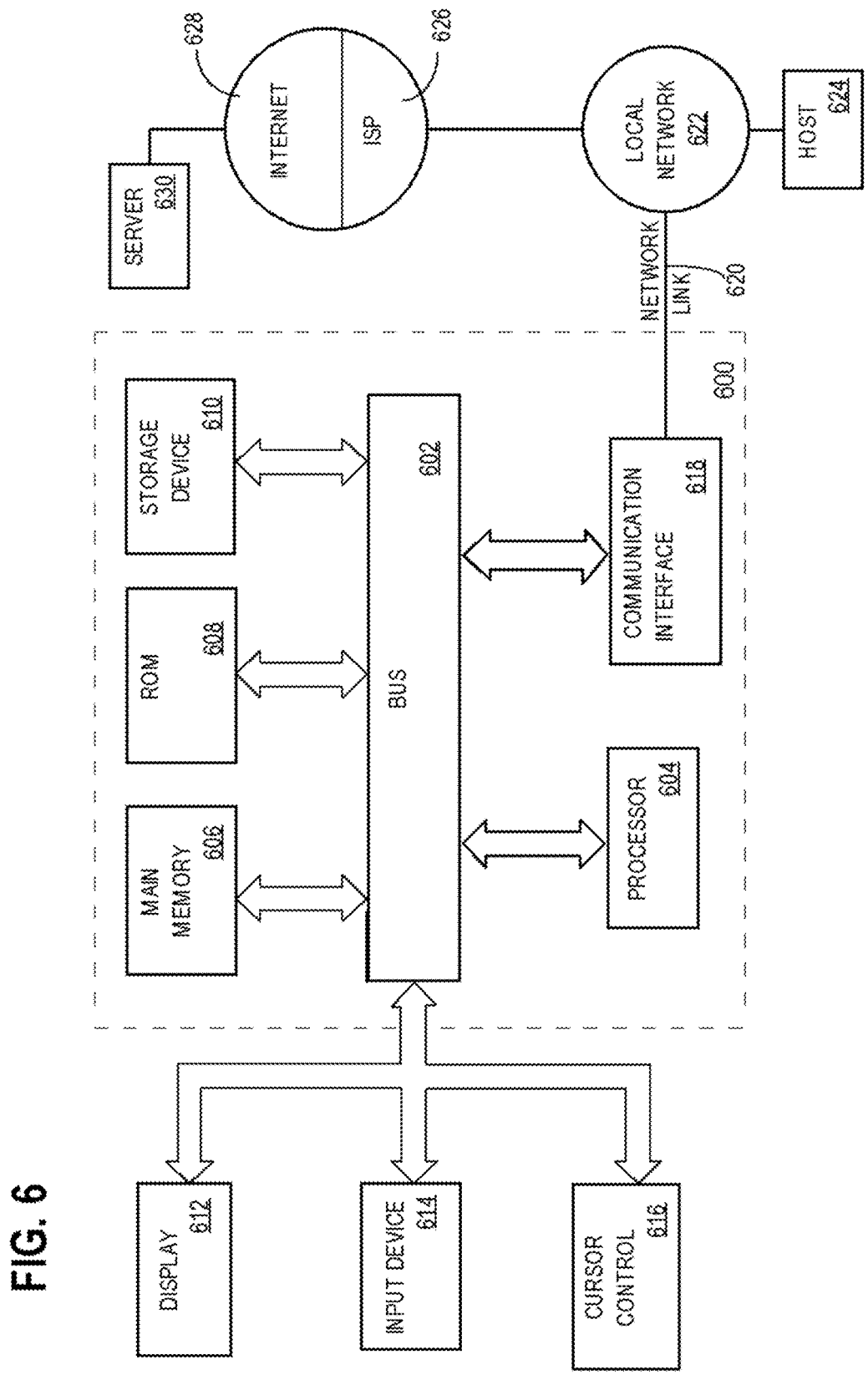
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    determining flat image areas in a predicted image, the predicted image being predicted from a first image mapped from a second image that has a higher dynamic range than the first image;
    generating, based at least in part on the flat image areas and the predicted image, a set of optimized operational parameter values for decontouring operations;
    performing, based at least in part on the set of optimized operational parameter values for decontouring operations, one or more smoothen operations on the predicted image to derive a smoothened image;
    applying, based at least in part on the set of optimized operational parameter values for decontouring operations, a residual mask to a residual image between the predicted image and the smoothened image to derive a masked residual image;
    encoding the set of optimized operational parameter values into a part of a multi-layer video signal that includes the first image.

2. The method as recited in claim 1, further comprising encoding the residual mask into the multi-layer video signal.

3. The method as recited in claim 1, wherein the second image is in a plurality of images that form a scene, and wherein image data derived from the plurality of images is encoded in the multi-layer video signal.

4. The method as recited in claim 1, wherein the first image is encoded as a part of base-layer (BL) image data in the multi-layer video signal.

5. The method as recited in claim 1, further comprising:
    generating residual values based at least in part on the decontoured image and the second image;
    applying non-linear quantization to the residual values to generate enhancement layer (EL) image data; and
    encoding the EL image data into the multi-layer video signal.

6. The method as recited in claim 1, wherein a decontoured image is generated based on the masked residual image and the predicted image.

7. The method as recited in claim 1, wherein the residual mask comprising binary values, and wherein the residual mask is applied to the residual image between the predicted image and the smoothened image through multiplication operations of the binary values in the residual mask.

8. The method as recited in claim 1, wherein the smoothen operations comprises one or more of resampling operations, sparse filtering operations, or blur operations.

9. The method as recited in claim 1, wherein the set of optimized operational parameter values for decontouring operations comprises an optimized value for a scaling factor used in resampling operations.

10. The method as recited in claim 1, wherein the set of optimized operational parameter values for decontouring operations comprises a smoothness threshold used to generate the residual mask.

11. The method as recited in claim 1, further comprising:
    determining one or more image areas with a high confidence level to have false contouring in an image;
    calculating one or more smoothness measures with a plurality of different sets of candidate operational parameter values with respect to the flat image areas; and
    selecting, based on the one or more smoothness measures, the set of optimal operational parameter values from the plurality of different sets of candidate operational parameter values.

12. The method as recited in claim 1, wherein the residual mask covers an entire area of the predicted image.

13. The method as recited in claim 1, wherein the one or more smoothen operations are performed on pixel values for a specific channel in a plurality of channels of a color space.

14. The method as recited in claim 13, wherein the plurality of channels comprises one or more of a luminance channel, a chroma channel, a red color channel, a blue color channel, a green color channel, or other primary channels.

15. The method as recited in claim 1, wherein base layer (BL) image data derived from the second images is compressed by a first encoder into the multi-layer video signal, and wherein enhancement layer (EL) image data derived from the second images is compressed by a second encoder in the multi-layer encoder into the multi-layer video signal.

16. A method, comprising:
    extracting a set of optimized operational parameter values from a multi-layer video signal that includes a first image mapped from a second image;
    performing, based at least in part on the set of optimized operational parameter values for decontouring operations, one or more smoothen operations on a predicted image to derive a smoothened image, the predicted image being predicted from the first image;
    applying a residual mask to a residual image between the predicted image and the smoothened image to derive a masked residual image;
    reconstructing a version of the second image based at least in part on the decontoured image.

17. The method as recited in claim 16, further comprising extracting the residual mask from the multi-layer video signal.

18. The method as recited in claim 16, wherein the first image is encoded as a part of base-layer (BL) image data in the multi-layer video signal.

19. The method as recited in claim 16, wherein the method is performed by a video decoder, and wherein the residual mask is constructed by the video decoder based at least in part on the set of optimized operational parameter values for decontouring operations.

20. The method as recited in claim 16, wherein the residual mask covers an entire area of the predicted image.

21. The method as recited in claim 16, wherein the one or more smoothen operations are performed on pixel values for a specific channel in a plurality of channels of a color space.

22. The method as recited in claim 21, wherein the plurality of channels comprises one or more of a luminance channel, a chroma channel, a red color channel, a blue color channel, a green color channel, or other primary channels.

23. A computing device comprising one or more processors and one or more storage media, storing a set of instructions, which when executed by one or more processors cause performance of the method cited in claim 1.

24. A system performing the method as recited in claim 1.

25. A non-transitory computer readable storage medium, storing software instructions, which when executed by one or more processors cause performance of the method recited in any of claim 1.

26. A computing device comprising one or more processors and one or more storage media, storing a set of instructions, which when executed by one or more processors cause performance of the method recited in any of claim 16.

* * * * *